United States Patent
Watson et al.

(10) Patent No.: US 10,467,980 B2
(45) Date of Patent: Nov. 5, 2019

(54) SYSTEMS AND METHODS FOR SUPPORTING AUGMENTED REALITY APPLICATIONS ON A TRANSPORT VEHICLE

(71) Applicant: PANASONIC AVIONICS CORPORATION, Lake Forest, CA (US)

(72) Inventors: Philip Watson, Lake Forest, CA (US); Steven Bates, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 15/452,612

(22) Filed: Mar. 7, 2017

(65) Prior Publication Data

US 2018/0261186 A1   Sep. 13, 2018

(51) Int. Cl.
*G09G 5/00*    (2006.01)
*G06F 9/54*    (2006.01)
*G06T 19/00*   (2011.01)

(52) U.S. Cl.
CPC ............. *G09G 5/006* (2013.01); *G06F 9/541* (2013.01); *G09G 2370/16* (2013.01)

(58) Field of Classification Search
CPC ............... B60R 1/00; B60R 2300/406; B60R 2300/8086; G06F 9/541; G06T 19/006; G09G 5/006; G09G 2370/16
See application file for complete search history.

(56) References Cited

U.S. PATENT DOCUMENTS

| | | | | |
|---|---|---|---|---|
| 2010/0238161 A1* | 9/2010 | Varga | ..................... | G06T 17/05 345/419 |
| 2011/0314507 A1* | 12/2011 | Keen | ........................ | H04N 7/18 725/77 |
| 2013/0083061 A1* | 4/2013 | Mishra | ................... | H04N 5/265 345/633 |

(Continued)

FOREIGN PATENT DOCUMENTS

EP    2819100 A1 * 12/2014    ........... G06T 19/006
EP    2819100 A1 * 12/2014

*Primary Examiner* — Michael Le
(74) *Attorney, Agent, or Firm* — Vista IP Law Group LLP

(57) ABSTRACT

Systems, devices, and methods for providing and supporting the operation of augmented reality applications on a transport vehicle, such as an airplane, train, bus, automobile, etc. The system includes an onboard management system which is configured to be installed on the vehicle. The onboard management system comprises a computer system having a processor memory, a storage device and management software. The management software includes an application programming interface (API) configured to interface with an augmented reality application on a computer system configured to execute the augmented reality application and display an augmented reality experience. The onboard management system is configured to obtain vehicle data and provide one or more of vehicle location, orientation, altitude, and environmental data to the computer system via the API in response to a call from the augmented reality application. The computer system may then utilize the data in the operation of the augmented reality application.

20 Claims, 2 Drawing Sheets

(56) References Cited

U.S. PATENT DOCUMENTS

2013/0278631 A1* 10/2013 Border ................. G02B 27/017
  345/633
2014/0248959 A1  9/2014 Jabara et al.
2016/0380914 A1* 12/2016 Tuukkanen ............. H04L 67/16
  709/226

* cited by examiner

SYSTEMS AND METHODS FOR SUPPORTING AUGMENTED REALITY APPLICATIONS ON A TRANSPORT VEHICLE

FIELD OF THE INVENTION

The present invention relates generally to augmented reality applications, and more particularly, to systems and methods for providing and supporting augmented reality applications on a transport vehicle, such as an airplane, train, bus, automobile, etc.

BACKGROUND OF THE INVENTION

Augmented reality is a computer technology that replicates a real-world environment at least in part in which the elements thereof are augmented and/or supplemented by an information processing device, such as a computer. In particular, a computer-generated simulation provides sensory input such as video, sound, graphics, and/or tactile feedback, and simulates a user's presence in the environment allowing user interaction with the environment. Current forms of augmented reality are displayed on a computer display or with a special virtual reality headset worn over the user's eyes, which provides visual and sound simulations of the virtual reality experience. Some simulations also include additional sensory input, such as haptic/tactile feedback to the user to simulate various interactions with the virtual reality. The user may interact with the augmented reality using standard computer input devices such as a keyboard and mouse, and also through multimodal devices such as gloves or other wearables having sensors to detect motion and forces, and/or external motion sensors which detect a user's position and motions.

Current augmented reality systems and software applications generally use one or more tracking technologies to track the position and/or orientation of the augmented reality device or a user's position and motions. Such tracking technologies may include a GPS receiver (a device which receives geolocation data from a global positioning system), accelerometers, optical cameras, gyroscopes, and/or other sensors.

Augmented reality applications may be video games, informational content, or simply entertainment. An example of a currently popular augmented reality applications is the video game POKEMON GO for smartphones and tablet computers, in which characters are generated by the application, overlaid onto camera images taken by the camera of the smartphone and displayed on the display of the smartphone. The user can then play the game by interacting with the augmented reality environment using an input device of the smartphone, such as a touchscreen.

An augmented reality application may be operated on a vehicle using a passenger's personal electronic device (PED), or on an in-seat display system installed at the seat of each passenger. For example, a passenger may bring their personal electronic device onto the vehicle, and then operate the augmented reality application on the personal electronic device. Alternatively, the in-seat display system of the vehicle may have an augmented reality application operating on the in-seat display system.

However, certain tracking devices, such as GPS receivers, are not available while on a transport vehicle, such as an airplane, automobile, passenger train, bus, cruise ship, or the like. For example, when a personal electronic device such as a smartphone or tablet is in airplane mode, the GPS module is disabled. Also, GPS signals may be blocked or attenuated within a vehicle such that the GPS module cannot receive a sufficient signal from the GPS system to provide accurate geolocation data. Accordingly, an AR system which utilizes GPS location data to track the position of the device may not have full functionality while on the vehicle.

In addition, the augmented reality applications may utilize camera images taken by the smartphone or tablet as the image of the real-world environment which is augmented by computer-generated simulation. While on a vehicle, the smartphone or tablet will typically not have unobstructed views of the environment surrounding the vehicle, and therefore cannot capture good camera images of the surrounding environment for use in the augmented reality application.

Accordingly, the present invention is directed to systems and methods for supporting an augmented reality application which can provide tracking data, camera images, and other data to an augmented reality application operating on an electronic device on a vehicle.

SUMMARY

Generally, the present disclosure is directed to systems and methods for providing and supporting the operation of augmented reality applications on a transport vehicle, such as an airplane, train, bus, automobile, etc. The augmented reality applications are software programs executable on a computing device having a processor, memory, operating system software and a display, such as an LCD (liquid crystal display) display or other suitable display. For example, the computing device may be a passenger's PED, or an in-seat entertainment system installed on a vehicle. The combination of the computing device and the augmented reality application executable thereon represents an augmented reality system ("AR system"). Thus, as used herein, the term "AR system" means a computing device having a processor, memory, a display and an augmented reality application operable on the computing device.

In one embodiment, the present invention is directed to a system for supporting an augmented reality application operating on an AR system. The system includes an onboard management system which is configured to be installed on the vehicle. For example, the onboard management system may be an onboard entertainment system, such as an in-flight entertainment system (IFE) or other computing system for managing the operation of onboard computing functions on the vehicle. The onboard management system comprises a computer system having a processor memory, a storage device and management software. The management software includes an application programming interface (API) configured to interface with the augmented reality application on the AR system. The onboard management system also has sensors or is in communication with at least one vehicle sensor, such as a GPS module or being in operable communication with a vehicle GPS module installed on the vehicle. The onboard management system is configured to obtain vehicle sensor data and provide the data to the AR system via the API in response to a call from the augmented reality application operating on the AR system. For instance, the augmented reality application has as routine, subroutine, protocol or the like instructing the AR system to communicate with the onboard management system and request sensor data, such as GPS location data. The API of the onboard management system receives the request and responds by communicating the sensor data to the AR system. The AR system may then utilize the sensor data in the operation of the augmented reality application.

In another aspect, as described above, the AR system may be a passenger's PED, an in-seat display system installed at a passenger seat of the vehicle, or other suitable computing device having an augmented reality application.

In another feature, the onboard management system may have a wireless communication module configured to establish a wireless link with the PED, such as establishing Wi-Fi network, Bluetooth network, or other suitable wireless communication network. The onboard management system is then configured to provide the vehicle sensor data to the PED via the wireless link and the API.

In another aspect, the onboard management system may be further configured to access vehicle sensor data regarding sensors installed on the vehicle, such as vehicle speed data, vehicle acceleration data, vehicle altitude data, vehicle thrust data, vehicle controls data (e.g., rudder position on an airplane), outside temperature data, actual and forecasted weather data, etc. The onboard management system can then provide the vehicle sensor data to the AR system via the API in response to a call to the API from the AR system.

In still another aspect, the onboard management system may be further configured to receive images taken by a camera installed on the vehicle, such as a camera directed to take images of the environment surrounding the vehicle or within the vehicle. The onboard management system can then provide the images to the AR system via the API in response to a call to the API from the AR system.

In another embodiment, the present invention is directed to a device or system for operating an augmented reality application, i.e., displaying augmented reality images on a vehicle. The device comprises a passenger's PED, such as a smartphone, tablet computer, etc., having a processor, memory, a wireless communication module, a display and an augmented reality application executable on the PED. The augmented reality application is configured to interface with an API of the onboard management system (same or similar to the API described above). The PED is configured to perform a process including executing the augmented reality application; establishing a wireless link with the onboard management system using the wireless communication module, obtaining vehicle sensor data from the onboard management system via the wireless link by a call to the API from the augmented reality application; obtaining a camera image of a real-world environment from a perspective of the PED; generating an overlay image based on the GPS location data obtained from the onboard management system or from the location data of the PED within the vehicle; overlaying the overlay image onto the camera image; and displaying the camera image with the overlay image on the display of the PED.

In another aspect, the PED may obtain the camera image by capturing the camera image using a camera of the PED. Many PEDs such as smartphones and tablet computers have digital cameras for taken images, such as video and still images. In another feature, the PED may obtain the camera image by receiving the camera image from a camera of the vehicle via the wireless link by a call to the API from the augmented reality application to transfer the camera image from the onboard management system to the AR system.

In still another feature, the PED may obtain vehicle information corresponding to vehicle sensor data regarding a sensor installed on the vehicle via the wireless link by a call to the API from the augmented reality application.

In still another aspect, the PED operating the augmented reality application may simulate controlling the vehicle and display images of a surrounding environment on the display of the PED corresponding to the simulated control of the vehicle. In still another feature, the display of images of the surrounding environment may be at least partially based upon an orientation of the PED. For instance, the PED may have accelerometers with which the PED can sense and determine the orientation of the device, such as facing forward, backward, left or right, and the displayed images will correspond to the direction the PED is facing.

Still another embodiment of the present invention is directed to a method for supporting an augmented reality application operating on a PED while on a vehicle. The method includes an onboard management system installed on a vehicle establishing a wireless link with the PED. The onboard management system obtains vehicle data, such as using the devices and methods described above. The onboard management system then provides the obtained data to the PED via an API of the onboard management system and the wireless link in response to a call to the API from the augmented reality application operating on the PED.

In additional aspects and feature, the method of supporting an augmented reality application operating on a PED while on a vehicle may include the any of the applicable additional aspects described herein for the other embodiments of the present invention.

Yet another embodiment of the present invention is directed to a system for operating an augmented reality application on an AR system comprising both the onboard management system and the AR system in combination. For example, the system may comprise an onboard management system for installation on a vehicle. The onboard management system includes a computer system having a processor, memory, a storage device, a network adapter for establishing a communication network, and management software. The management software has an API configured to interface with the augmented reality application on the AR system. The onboard management system also has one or more sensors or is in communication with a vehicle sensor in order to obtain one or more of vehicle location, orientation, altitude, and environmental data. The onboard management system is configured to obtain sensor data and to provide to an augmented reality application on the AR system in response to a call from the augmented reality application operating on the AR system. The system also includes an AR system comprising a processor, memory, operating system software, a network module, a display and an augmented reality application configured to interface with the onboard management system of a vehicle via the API of the onboard management system. The AR system configured to perform a process comprising: establishing a network link with the onboard management system using the network module; obtaining the data from the onboard management system via the wireless link by a call to the API from the augmented reality application; obtaining a camera image of a real-world environment from a perspective of the AR system; generating an overlay image based on the data obtained from the onboard management system; overlaying the overlay image onto the camera image; and displaying the camera image with the overlay image on the display of the AR system.

The system comprising the onboard management system and the AR system may also include any of the additional features and aspects described herein for the other embodiments of the present invention, including the additional features and aspects of the onboard management system, the AR system, the PED, and/or the described methods.

BRIEF DESCRIPTION OF THE DRAWINGS

The foregoing and other aspects of embodiments are described in further detail with reference to the accompanying drawings, wherein like reference numerals refer to like elements (e.g., elements having the same number are considered like elements such as 50a and 50b) and the description for like elements shall be applicable for all described embodiments wherever relevant.

DETAILED DESCRIPTION

Figure 1:
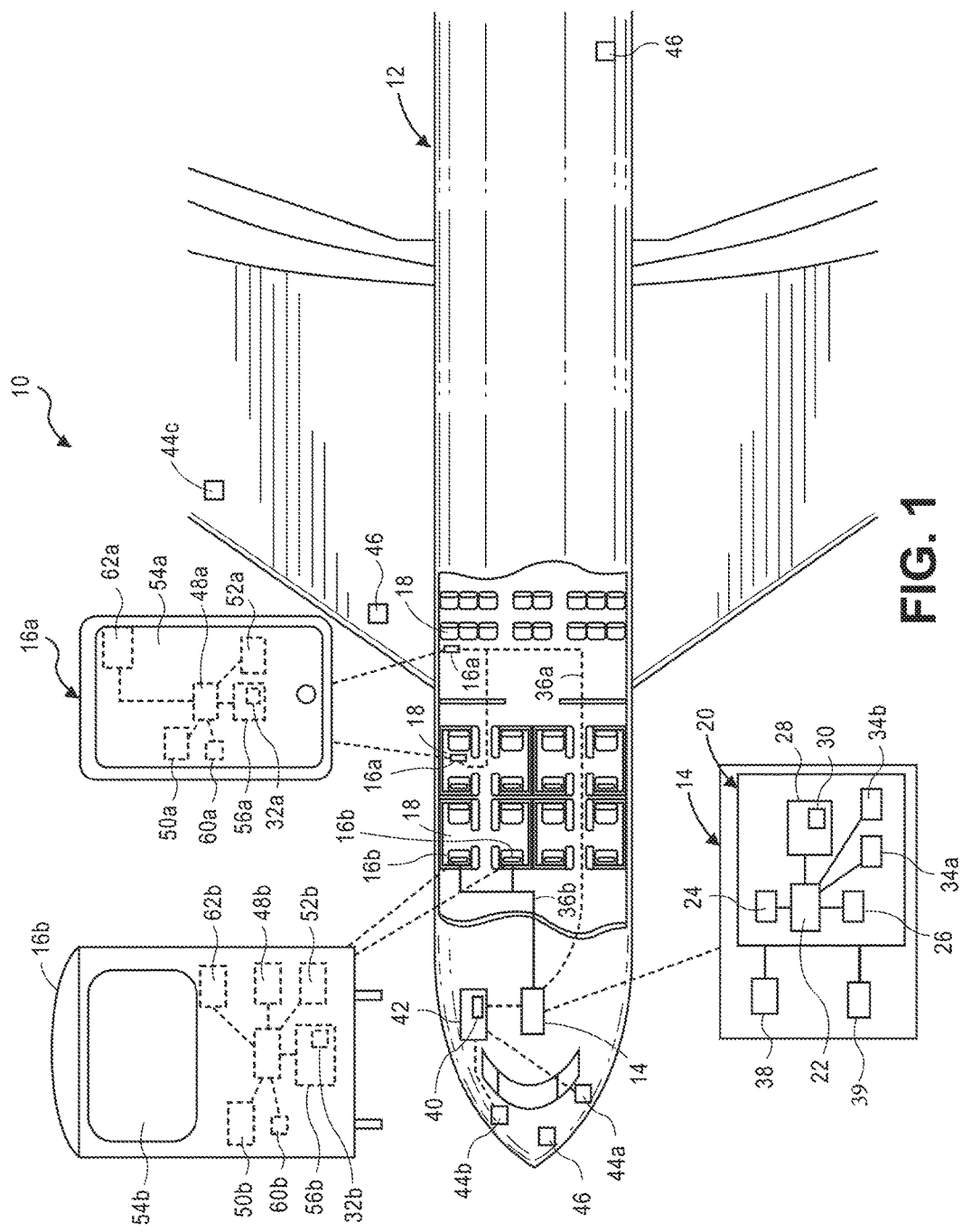
FIG. 1 is a schematic view top view of a system for operating an augmented reality application on an augmented reality system while on an airplane, according to one embodiment of the present invention.

Referring to FIG. 1, one embodiment of a system 10 for operating an augmented reality application on an augmented reality system while on a vehicle 12, which in this exemplary embodiment is an airplane 12, is illustrated. While the embodiments described herein are directed to a system 10 for an airplane 12, the present invention is not limited to a particular type of transport vehicle, and may be utilized on any other type of vehicle, such as an automobile, truck, bus, train, ship, etc.

The system 10 includes an onboard management system 14 installed in the airplane 12, and one or more AR systems 16a and 16b. The AR system 16a is a passenger's PED 16a, and the AR system 16b is an in-seat display system 16b installed at a seat 18 of the airplane 12. The onboard management system 14 is a computing system for operating various functions on the airplane 12, and comprises a computer system 20 having one or more computer processors 22, memory 24, a data storage device 26, and system software 28 for programming the computer system 20 to perform the functions of the onboard management system 14. For example, the onboard management system 14 may be an in-flight entertainment system for providing audio/video entertainment to the AR systems 16a and 16b, an onboard internet service system, providing airplane messages like fasten seat-belt messages, lavatory occupied status indicators and/or other in-flight functions.

The system software 28 includes an API 30 configured to interface with an augmented reality application 32a and 32b on the respective AR systems 16a and 16b. The API 30 is configured to provide requested data from the onboard management system 14 to the AR system 16 in response to a call to the API from the augmented reality application 22 operating on the AR system 16. The onboard management system 14 also has one or more network adapters 34 (also referred to as a "communication module") for establishing a communication network 36 with the AR systems 16a and 16b. A network adapter 34a may be a wireless network adapter 34a which is a wireless network module for establishing a wireless communication network 36a with the AR systems 16a and/or 16b. The network adapter 34a may be a Wi-Fi module for establishing a Wi-Fi wireless network, a Bluetooth module for establishing a Bluetooth wireless network, a wireless USB module for establishing a wireless USB network, or other suitable wireless network module. A network adapter 34b is a wired network module for establishing a wired communication network 36b with the AR systems 16a and/or 16b, such as an Ethernet communication network, a USB communication network, or the like. For instance, the onboard management system 14 may be wired to each of the AR systems 16b such that it uses the wired network adapter 16b to establish a wired communication link with each of the AR systems 16b, while the onboard management system 14 uses the wireless network adapter 34a to establish a wireless communication link with each of the AR systems 16a.

The onboard management system 14 also has access to vehicle data. The vehicle data includes data from one or more vehicle sensors or data provided to the vehicle from another source, such as weather data and/or other environmental data that may be transmitted to the vehicle from satellites or ground stations. In one example, the onboard management system 14 includes a GPS receiver 38 (also referred to as a "GPS module 38") which is operably coupled to the computer system 20. It is understood that any one or more of the GPS receiver module 38, the network adapters 34a and 34b, and/or the processors 22 may be integrated onto a single multi-function microprocessor. Alternatively, the onboard management system 14 may be in operable communication with a GPS receiver 40 installed on the airplane 12 separate from the onboard management system 14, such as a GPS receiver 40 which is a component of the avionics 42 of the airplane 12. The onboard management system 14 also has access to airplane operation/status data, such as airplane sensor data regarding one or more sensors 44 of the airplane 12 and/or the operation/status of various airplane systems. The onboard management system 14 may be in direct communication with the sensors 44 and/or airplane system, or the onboard management system 14 may access the vehicle sensor data and/or status of airplane systems via a communication link with another airplane system, such as the avionics 42. The vehicle sensors 44 may include for example, an airplane speed sensor 44a, an altitude sensor 44b, a thrust sensor 44c, outside temperature sensor (not shown), interior temperature sensor (not shown), etc., and/or vehicle system status such as vehicle controls data (e.g., rudder position, thrust control position, vehicle orientation and position, acceleration, speed, etc.), lavatory occupied status, fasten seat belt indicator status, flight path and flight status information, etc. The onboard management 14 may receive at least some of the data 44 via a data bus 39, such as a data bus in accordance with the ARINC (Aeronautical Radio INC.) 429 standard or comparable aircraft sensor communication/distribution method. For instance, the onboard management system 14 may receive wind speed, temperature, altitude, heading, and actual and forecasted weather data and other data via the data bus 39. ARINC 429P1-18 includes attachment 1-1 listing the data available via a data bus 39 in accordance with ARINC 429 (also known as a Mark33 Digital Information Transfer System (DITS)).

The onboard management system 14 also has access to camera images taken by one or more cameras 46 installed on and/or in the airplane 12. The cameras 46 are configured and located to capture images, including video and still images, of the environment surrounding the airplane 14, such as in front of, to the sides, below, above, and/or behind the airplane 14. For example, one or more of the cameras 46 may be omnidirectional cameras having a 360 degree field of view. In addition, one or more of the cameras 46 may be configured and located to take camera images of the interior of the airplane 14, such as in the cockpit, the cabin, the galleys, and/or other areas of interest in the airplane 14.

Similar to the airplane operation/status data, the onboard management system 14 may have direct access to the cameras in order to receive the camera images, or it may be in communication with another airplane system which accesses the camera images from the cameras 46.

As described above, the API 30 of the onboard management system 14 is configured to interface and to provide requested data from the onboard management system 14 to the AR system 16 in response to a call to the API from the augmented reality application 22 operating on the AR system 16. Accordingly, the API 30 may provide one or more of GPS location data, airplane operation/status data, and/or camera images from the airplane cameras 46 to the AR system 16, environmental data, and other data in response to a call from the augmented reality application for the requested data. The onboard management system 14 provides the requested data via the appropriate communication network, such as the wireless communication network 36a or the wired communication network 36b.

The AR system 16a comprises a passenger's PED 16a, such as a smartphone, tablet computer, personal computer, or other suitable computing device. The PED 16a is configured to execute software applications (computer programs), including augmented reality applications. The PED 16a has a processor 48a, memory 50a, a wireless communication module 52a, a display 54a, a storage device 56a, and the augmented reality application 32a stored on the storage device 56. The PED 16a may also have a motion sensor 60a configured to allow the PED 16a to determine its orientation and location relative to a reference, and a camera 62a for taking camera images. The wireless communication module 52a is configured to establish a wireless link to the wireless communication network 36a of the wireless network adapter 34a of the onboard management system 14. The display 5a4 may be a touchscreen display, such as a touchscreen LCD, touchscreen LED, or other suitable touchscreen display to allow a user to provide inputs to the PED 16a for interacting with the augmented reality application 32a. Alternatively, or in addition, the PED 16a may have a user input device, such as a button, joystick, touchpad, etc. for interacting with the augmented reality application 32a.

The augmented reality application 32a is configured to program the PED 16a to provide an augmented reality experience, such as an augmented reality game or augmented reality informational content, on the display 54a of the PED 16a. The augmented reality application 32a has one or more calls to the API 30 for obtaining GPS location data, airplane operation/status data, and/or camera images from the onboard management system 14. While operating the augmented reality application 32a, the PED 16a obtains data from the onboard management system 14 via the API 30 and wireless link by the calls to the API 30 from the augmented reality application 32a. The augmented reality application 32a is further configured to utilize the GPS location data, airplane operation/status data, and/or camera images from the onboard management system 14 in generating the augmented reality experience displayed on the display 5a4. For example, the PED 16a obtains a camera image of a real world environment from the PED camera 62a or from the vehicle cameras 46 via onboard management system 14 using a call to the API 30, generates an overlay image based on the GPS location data and/or other data obtained from the onboard management system 14, and then overlays the overlay image onto the camera image and displays the camera image with the overlay on the display 54a.

The AR system 16b is similar to the AR system 16a, except that it is an in-seat display system 16b installed at a seat 18 of the airplane 12. The in-seat display system 16b may be installed in a seat-back or it may be installed in separate console such as in business class or first class seating modules (e.g., seating modules are shown in the forward class of seats in FIG. 1). The in-seat display system 16b includes one or more processors 48b, memory 50b, a communication module 52b (which may be a wireless communication module and/or a wired communication module), a display 54b, a storage device 56b, and the augmented reality application 32b stored on the storage device 56b. The in-seat display system 16b may also have a motion sensor 60b configured to allow the PED 16a to determine its orientation and location relative to a reference, and a camera 62b for taking camera images. The communication module 52b is configured to establish a communication link to the at least one of the wired communication network 36b and/or the wireless communication network 36a. The display 54b may be a touchscreen display, such as a touchscreen LCD, touchscreen LED, or other suitable touchscreen display to allow a user to provide inputs to the in-seat display system 16b for interacting with the augmented reality application 32b. Alternatively, or in addition, the in-seat display system 16b may have a user input device, such as a button, joystick, touchpad, remote control, etc. for interacting with the augmented reality application 32b.

The augmented reality application 32b is configured to program the in-seat display system 16b to provide an augmented reality experience, such as an augmented reality game or augmented reality informational content, on the display 54b of the in-seat display system 16b. The augmented reality application 32b has one or more calls to the API 30 for obtaining GPS location data, airplane operation/status data, and/or camera images (collectively referred to as "vehicle data" or simply "data") from the onboard management system 14. While operating the augmented reality application 32b, the in-seat display system 16b obtains data from the onboard management system 14 via the API 30 and communication network 36a and/or 36b by the calls to the API 30 from the augmented reality application 32b. The augmented reality application 32b is further configured to utilize the GPS location data, airplane operation/status data, and/or camera images from the onboard management system 14 in generating the augmented reality experience displayed on the display 54b. For example, the in-seat display system 16b obtains a camera image of a real world environment from a passenger's camera, or from the vehicle cameras 46 via onboard management system 14 using a call to the API 30, generates an overlay image based on the GPS location data and/or other data obtained from the onboard management system 14, and then overlays the overlay image onto the camera image and displays the camera image with the overlay on the display 54b.

In one embodiment, the augmented reality application 32 is configured to simulate control of the airplane 12, or other vehicle 12. For instance, the user input, such as via the touchscreen display 54, can simulate maneuvering the airplane, including turning, ascending, descending, taking off, landing, etc., and the augmented reality application 32 programs the AR system 16 to display on the display 54 images of the environment surrounding the airplane 12, such as sky, clouds, other objects in the sky like other airplanes, birds, etc. and the landscape below the airplane, corresponding to the simulated control and maneuvering of the airplane 12. In an additional feature, or another embodiment, the augmented reality application 32 may display on the display 54 full airplane three-dimensional (3D) position information, such as the airplane path, orientation, and may also show visual tracks showing the flight path overlaid onto the camera images.

In another embodiment, the augmented reality application 32 is configured to show a portion or portions of the vehicle 12 on the display 54 relative to its location within the vehicle 12, such as maintenance or safety devices or facilities, e.g., show a passenger the location and status of lavatories. The augmented reality application 32 could also show safety features in the form of an X-ray-like picture on the display 54, for example, the location of the emergency exit in the aircraft interior plane, and a view through the aircraft cabin wall depicting how the emergency exist opens above a wing. Weather data could be consolidated from the ground, both actual and forecasted, such as cold fronts, wind shear, wind direction, etc., and shown on the display 54 over camera images of surrounding clouds.

Figure 2:
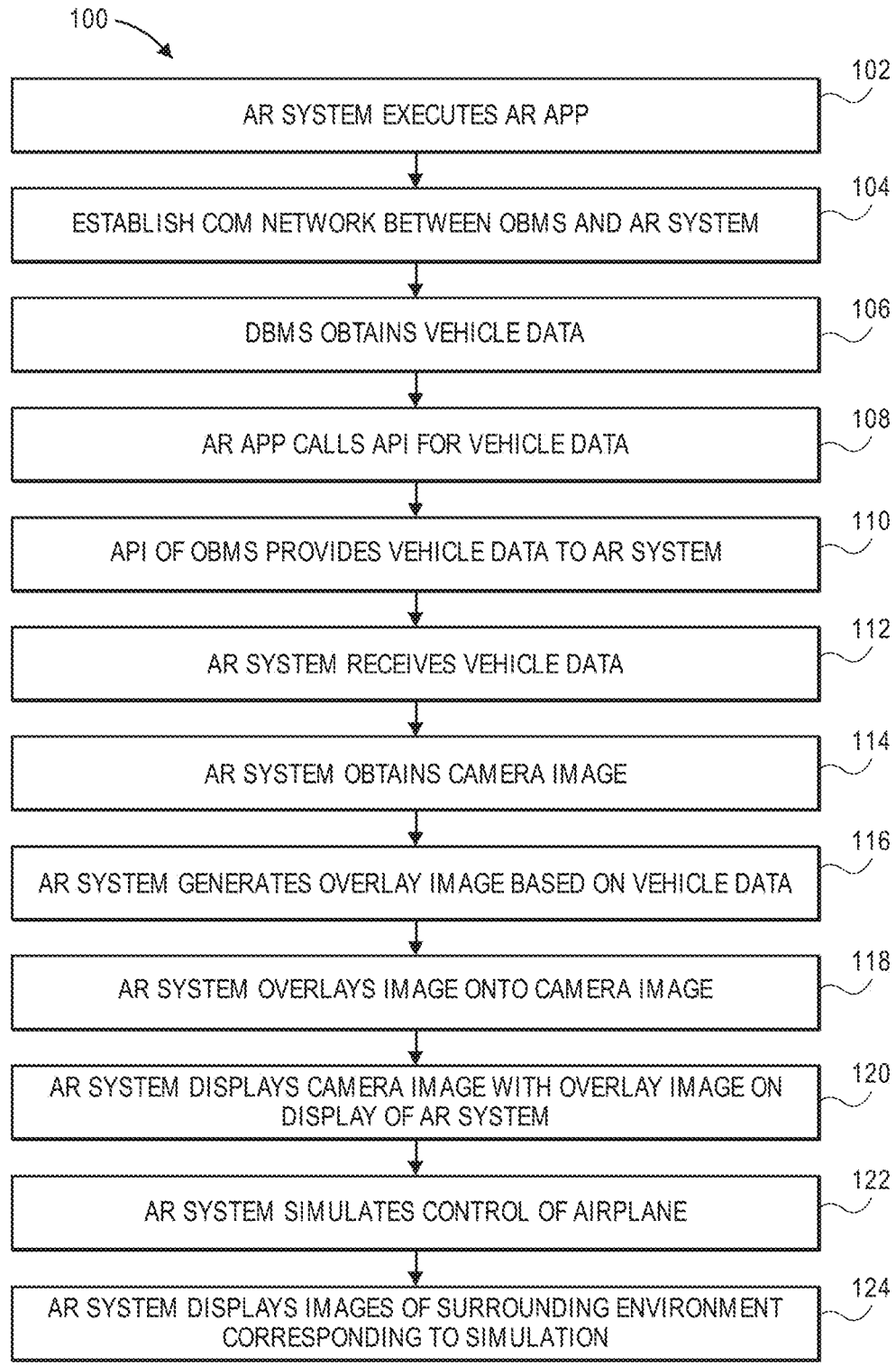
FIG. 2 is flow chart illustrating a method of operation of the system of FIG. 1, according to one embodiment of the present invention.

Referring now to FIG. 2, a method 100 for the operation of the system 10, and its components such as the onboard management system 14, PED 16*a*, and the in-seat display system 16*b* will be described. At step 102, the AR system 16 (which may be either the PED 16*a* or the in-seat display system 16*b*) executes the augmented reality application 32. At step 104, the onboard management system 14 and the AR system 16 establish a communication network 36 (either wireless communication network 36*a* or wired communication network 36*b*), as described herein. At step 106, the onboard management system 14 obtains vehicle data, including one or more of GPS location data, airplane operation/status data, and/or camera images from the airplane cameras 46, as described herein.

At step 108, the augmented reality application 32 executes a call to the API 30 of the onboard management system 14 via the communication network 36 for vehicle data, including one or more of GPS location data, airplane operation/status data, and/or camera images from the airplane cameras 46. At step 110, the API 30 of the onboard management system 14 provides to the AR system 16, via the API 30, the requested vehicle data. At step 112, the AR system 16 receives the requested vehicle data. At step 114, the AR system 16 obtains a camera image, which may be a camera image captured by the AR system 16 (e.g., a camera image taken by the camera 62 of the AR system 16, or a camera image received from the onboard management system 14 via the API 30). At step 116, the AR system 16 generates an overlay image based at least partially upon the vehicle data. At step 118, the AR system 16 overlays the overlay image onto the camera image, and at step 120, the AR system displays the camera image with the overlay image on the display 54 of the AR system 16.

In the specific embodiments of the augmented reality application 32, at step 122, the AR system 16 simulates control of the airplane 12 on the AR system 16. For example, the AR system 16 may allow the user to simulate maneuvering the airplane using the touchscreen and/or other user input devices. At step 124, the AR system 16 displays camera images of the surrounding environment on the display 54 corresponding to the simulation of control of the airplane 12. The camera images may be obtained from a camera 62 of the AR system 16 or from camera images taken by the cameras 46 obtained via the API 30 from the onboard management system 14.

It is to be understood that the steps of the method 100 are not required to be performed in the order as shown and described, unless logic or functionality requires a certain order. For instance, step 102 for executing the augmented reality application 32 can be performed before or after step 104 for establishing the either wireless communication network 36*a* or wired communication network 36*b*), as described herein.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A system for supporting an augmented reality game operating on an augmented reality system (AR system) on a vehicle, the augmented reality system and augmented reality game configured to provide a video game comprising a computer-generated simulation of an environment having virtual creatures appearing in the simulated environment and simulating a user's presence in the environment, the system comprising:

an onboard management system for installation on a vehicle, the onboard management system comprising a computer system having a processor, memory, a storage device and management software having an application programming interface (API) configured to interface with the augmented reality application on the AR system, the API comprising a modular software component executable by a call from the AR system, the onboard management system having sensors or being in communication with at least one vehicle sensor in order to obtain at least one of vehicle location, orientation, altitude, and environmental data;

wherein the onboard management system is configured to obtain vehicle sensor data and provide the data to the AR system via the API in response to a call from the augmented reality application operating on the AR system, while the AR system is in airplane mode, such that the augmented reality application utilizes the vehicle sensor data in the augmented reality experience.

2. The system of claim 1, wherein the AR system comprises one of: a passenger's personal electronic device, and an in-seat display system installed at a seat of the vehicle.

3. The system of claim 1, wherein the AR system comprises a passenger's personal electronic device (PED) having the augmented reality application operating on the PED, and wherein:

the onboard management system further comprises a wireless communication module configured to establish a wireless link with the PED; and the onboard management system is configured to provide the vehicle sensor data to the PED via the wireless link while the PED is in airplane mode.

4. The system of claim 1, wherein the onboard management system is configured to access vehicle sensor data regarding sensors installed on the vehicle, and to provide vehicle information corresponding to the vehicle sensor data to the AR system via the API in response to a call to the API from the augmented reality application operating on the AR system.

5. The system of claim 1, wherein the onboard-management system is configured to receive images taken by a camera installed on the vehicle and the camera directed outside or toward or within the vehicle, and to provide the images to the AR system via the API in response to a call to the API from the augmented reality application operating on the AR system.

6. The system of claim 1, wherein the onboard management system is configured to provide data via the API in which the data corresponds to a 3D travel path of the vehicle through the surrounding environment.

7. The system of claim 1, wherein the AR system comprises an in-seat display system installed at a seat of the vehicle having the augmented reality application operating thereon, and wherein:
the onboard management system further comprises a wired or wireless communication link with the in-seat display system; and
the onboard management system is configured to provide the vehicle data to the in-seat display system via the wired or wireless link.

8. The system of claim 7, wherein the onboard management system is configured to access vehicle sensor data regarding sensors installed on the vehicle, and to provide vehicle information corresponding to the vehicle sensor data to the AR system via the API in response to a call to the API from the augmented reality application operating on the AR system.

9. The system of claim 8, wherein the onboard-management system is configured to receive images taken by a camera installed on the vehicle directing its camera outside or toward or within the vehicle, and to provide the images to the AR system via the API in response to a call to the API from the augmented reality application operating on the AR system.

10. A device for displaying augmenting reality images on a vehicle in which the vehicle includes an onboard management system having an application programming interface (API), the API comprising a modular software component executable by a call from the AR system, the device comprising:
a personal electronic device (PED) comprising a processor, memory, operating system software, a wireless communication module, a display and an augmented reality application configured to interface with the onboard management system of the vehicle via the API of the onboard management system; the PED configured to perform a process comprising:
executing the augmented reality application, the augmented reality application configured to provide a video game comprising a computer-generated simulation of an environment having virtual creatures appearing in the simulated environment, and simulating a user's presence in the environment;
establishing a wireless link with the onboard management system using the wireless communication module;
obtaining vehicle sensor data from the onboard management system via the wireless link by a call to the API from the augmented reality application while the PED is in airplane mode;
obtaining a camera image of a real-world environment;
generating an overlay image based on location data obtained from the onboard management system or from location data of the PED within the vehicle;
overlaying the overlay image onto the camera image; and
displaying the camera image with the overlay image on the display of the PED.

11. The device of claim 10, wherein the PED obtains the camera image by one of: capturing a camera image using a camera of the PED; and receiving the camera image from a camera of the vehicle via the network link by a call to the API from the augmented reality application to transfer the camera image from the onboard management system to the AR system.

12. The device of claim 10, wherein said process further comprises obtaining vehicle information corresponding to vehicle sensor data regarding a sensor installed on the vehicle via the wireless link by a call to the API from the augmented reality application.

13. The device of claim 10, wherein said process further comprises simulating control of the vehicle on the PED.

14. The device of claim 13, wherein said process further comprises displaying images of a surrounding environment on the display of the PED corresponding to the simulated control of the vehicle.

15. A system for operating an augmented reality application on an AR system on a vehicle, the system comprising:
an onboard management system for installation on the vehicle, the onboard management system comprising a computer system having a processor, memory, a storage device, a network adapter for establishing a communication network, and management software having an application programming interface (API) configured to interface with the augmented reality application on the AR system, the API comprising a modular software component executable by a call from the AR system, the onboard management system having at least one sensor or being in communication with a vehicle sensors in order to obtain at least one of vehicle location, orientation, altitude, and environmental data;
wherein the onboard management system is configured to obtain sensor data to provide to an augmented reality application on the AR system in response to a call from the augmented reality application operating on the AR system while the AR system is in airplane mode;
an AR system comprising a processor, memory, operating system software, a network module, a display and an augmented reality application configured to interface with the onboard management system of a vehicle via an API of the onboard management system configured to interface with the augmented reality application on the AR system; the AR system configured to provide a video game comprising a computer-generated simulation of an environment having virtual creatures appearing in the simulated environment and simulating a user's presence in the environment, and to perform a process comprising:
establishing a network link with the onboard management system using the network module;
obtaining sensor data from the onboard management system via the wireless link by a call to the API from the augmented reality application while the AR system is in airplane mode;
obtaining a camera image of a real-world environment from a perspective of the AR system;
generating an overlay image based on the GPS location data obtained from the onboard management system;

overlaying the overlay image onto the camera image; and displaying the camera image with the overlay image on the display of the AR system.

16. The system of claim 15, wherein the AR system comprises one of: a passenger's PED, and an in-seat display system installed at a seat of the vehicle.

17. The system of claim 15, wherein:

the onboard management system is configured to access vehicle sensor data regarding sensors installed on the vehicle, and to provide vehicle information corresponding to the vehicle sensor data to the AR system via the API and the network link in response to a call to the API from the augmented reality application operating on the AR system; and the process performed by the AR system further comprises obtaining vehicle information corresponding to vehicle sensor data regarding sensor installed on the vehicle via the wireless link by a call from to the API from the augmented reality application.

18. The system of claim 15, wherein:

the onboard-management system is configured to receive images taken by a camera installed on the vehicle, and to provide the images to the AR system via the API and network link in response to a call to the API from the augmented reality application operating on the AR system; and the AR system obtains the camera image from a camera of the vehicle via the network link by a call to the API from the augmented reality application to transfer the camera image from the onboard management system to the AR system.

19. The system of claim 15, wherein the AR system obtains the camera image by capturing the camera image using camera on the AR system.

20. The system of claim 15, wherein the process further comprises:

simulating control of the vehicle on the AR system; and displaying images of a surrounding environment on the display of the AR system corresponding to the simulated control of the vehicle.

* * * * *